United States Patent

[11] 3,577,630

[72] Inventor Bernard S. Appleton
   926 Midway, Woodmere, N.Y. 11598
[21] Appl. No. 855,346
[22] Filed Sept. 4, 1969
   Division of Ser. No. 699,893 Jan. 23, 1968,
   Pat. No. 3,479,893. Continuation-in-part
   of Ser. No. 566,960, July 21, 1966, Pat. No.
   3,451,282
[45] Patented May 4, 1971

[54] METHOD OF ATTACHING TRANSMISSION BELT AND PIN
   3 Claims, 8 Drawing Figs.
[52] U.S. Cl. .................................................. 29/517
[51] Int. Cl. .................................................. B21d 39/00,
   B23p 11/00
[50] Field of Search ....................................... 29/515,
   505, 517, 520; 74/229, 231 (C), 235

[56] References Cited
   UNITED STATES PATENTS
   472,893    4/1892  Little .......................... (29/517UX)
   1,417,229  5/1922  Byrne .......................... (29/517UX)
   2,864,154  12/1958 Sausman ........................ 29/517X
   3,091,030  5/1963  Zumbrunnen .................... 74/231(C)
   3,135,010  6/1964  Roassien ....................... 29/517X
   FOREIGN PATENTS
   ad.27,885  3/1924  France ......................... 29/517

Primary Examiner—Charlie T. Moon
Attorney—Edward Halle

ABSTRACT: This invention relates to flexible transmission belts adapted for use with sprocket wheel means. The transmission belts comprise transmission pin means with, or without, rollers, held together serially by an elongated body construction such as cable made of wire, cord, fabric or other suitable material. The invention contemplates a method of attaching the pins to the belt or cable, or cables by providing a pin with an opening adapted to encircle the cable, greater in diameter than the diameter of the cable, and then applying pressure to the pin until the material of the pin flows into at least a portion of the clear space between the cable and the opening in the pin so that a mass of material of the pin will grip the cable securely.

PATENTED MAY 4 1971

3,577,630

INVENTOR.
BERNARD S. APPLETON
BY Edward Halle
ATTORNEY.

METHOD OF ATTACHING TRANSMISSION BELT AND PIN

This application is a divisional application of my prior filed application for TRANSMISSION BELT, filed Jan. 23, 1968, Ser. No. 699,970, now U.S. Pat. No. 3,479,893, which is a continuation-in-part application of my prior filed application for TRANSMISSION BELT, filed July 21, 1966, Ser. No. 566,960, now U.S. Pat. No. 3,451,282.

The invention is illustrated in the accompanying drawings in which.

Figure 4:
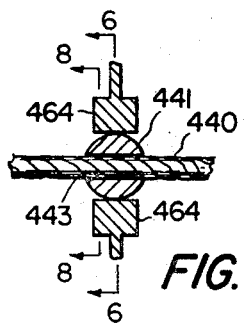
Figure 3:
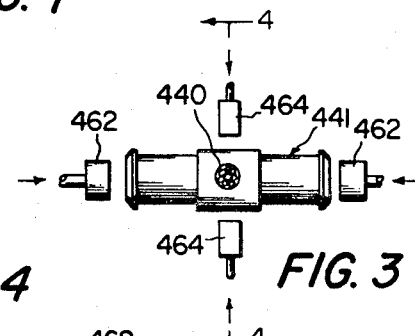
Figure 5:
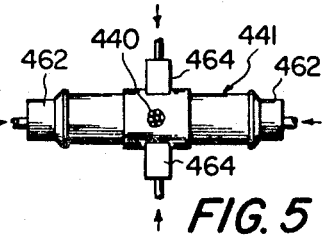
Figure 6:
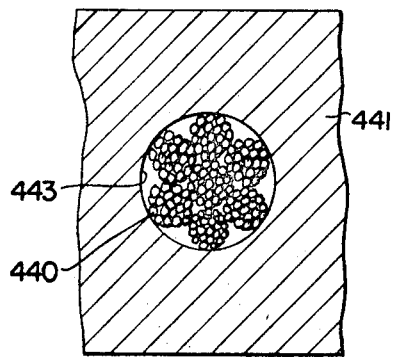
Figure 7:
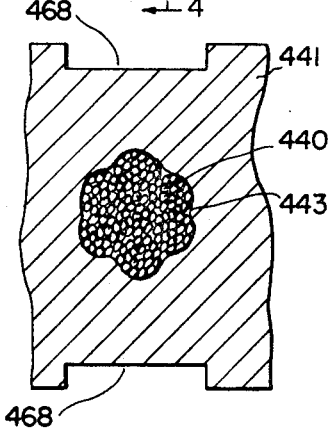
Figure 8:
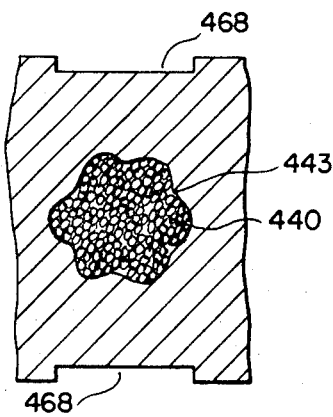

FIG. 3 is an elevational view of a pin 441 in position between punches 462 and 464 prior to pressing the material of the pin around the cable, it being understood that the punches are representative of punches in a punch press with the main body portion of the press being cutaway;

FIG. 4 is a sectional view along the lines 4-4 of FIG. 3 with punches 464 at a starting point of their press against the pin 441;

FIG. 5 is a view similar to FIG. 3 with punches 462 and 464 at the end of their punch stroke showing the material of pin 441 flowed around cable 440;

FIG. 6 is an enlarged section along the lines 6-6 of FIG. 4 with parts cutaway;

FIG. 7 is a view similar to FIG. 6 except that it shows the parts after the punches have flowed the material of pin 441 around cable 440; and FIG. 8 is a view similar to FIG. 7 except that the section is taken from a position as indicated at lines 8-8 in FIG. 4 to show a further section indicating the twist in the cable 440 and the configuration of the material flow around the twist in the cable.

Similar numerals refer to similar parts throughout the several views.

The type of pins and cables with which this invention is involved are generally described in my copending application Ser. No. 699,970 filed Jan. 23, 1968, and I rely on the complete description as set forth therein.

Figure 1:
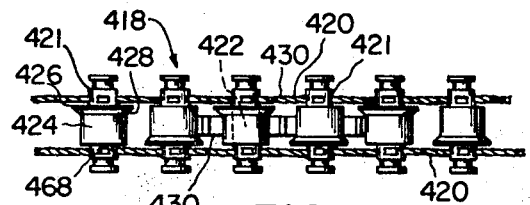
FIG. 1 is a top plan view of a transmission cable.

The method of this invention is to produce transmission chains or belts having a plurality of flexible spaced elongated body portion elements. One form of such transmission belt is shown in FIG. 1 of the drawings in which the belt 418 has a pair of flexible spaced elongated body portion elements 420, preferably made of steel cable such as braided wire. These elongated flexible body portion elements 420 carry a series of transmission pin means 421 comprising axle means 422 on which are mounted transmission roller means 424.

Figure 2:
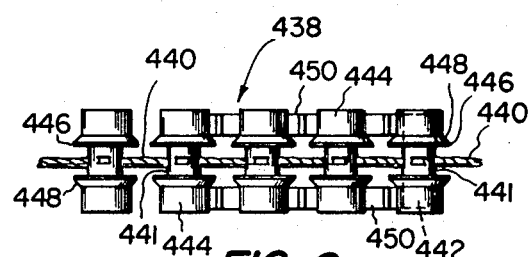
FIG. 2 is a top plan view of another form of transmission cable.

In FIG. 2 of the drawings, there is another form of transmission belt 438 having a flexible cable 440, transmission pins 441, axles 442 and transmission roller means 444. This is a single strand type of cable 438. Both the cables of FIG. 1 and FIG. 2 are adapted to be used with sprockets of various types.

It is the essence of this invention to provide a method of attaching the pins such as pins 421 and pins 441 to the cables such as cables 420, 430 and 440 as shown in FIGS. 1 and 2. The method of the invention is illustrated in FIGS. 3 through 8 inclusive.

A principal problem in connection with flexible cables has been the manner and means of securing the components together. For example, the transmission pins or axles for this type of cable must have the fluidity of flexibility in connection with the cables, and must also be connected to the cables in such a manner that there will be no shifting so that the pins may maintain a proper relationship with one another to fit the sprockets properly.

I have found that the use of a twisted wire cable having several main strands of wire with each main strand having several smaller strands of wire is suitable for the cable such as cable 420 or 440 as shown in FIGS. 1 and 2 of the drawings. I then select transmission pins of a material such as steel (or plastic) which may be flowed under pressure around the cable 440 as illustrated in FIGS. 3 and 8 of the drawings. I use the following method. I take a cable, for example, a 7×19 cable having 7 main strands, each of the 7 main strands having 19 smaller strands as illustrated by reference numeral 440 in the drawings. The cable of the invention may be a twisted wire cable as described of any number of strands. The number of strands selected as being 7×19 is for purposes of illustration only of a preferred form of the invention. In addition, any cord of other elongated flexible element of sufficient strength for the intended use of the belt may be used instead of a steel or wire cable. The cable 440 is prestretched by applying a tensile strength to it of about 60 to 70 percent of its rated strength. This is for the purpose of placing the cable under stress so that when the pins are clinched on, they will be in effect in proper position on a transmission belt made of the cable, which will not be further stretched when placed under tension in an operating situation. This is somewhat similar to preshrinking cloth before cutting it and manufacturing it into a garment.

Let us say that the diameter of my 7×19 cable is 0.066 of an inch. I then select a steel transmission pin such as pin 441 having an opening 443 with an internal diameter of 0.070 of an inch. The cable 440 is inserted through the opening 443 (after stretching the cable) as shown in FIG. 3 of the drawings. In FIG. 4, I show another view of the cable 440 in the pin 441 being held in a position on a press, with punches 462 about to apply edge pressure and punches 464 about to apply clinching pressure. In the preferred method, I first provide for punches 462 to hold the pin in position, and then simultaneously apply pressure from punches 464 and punches 462 as shown in FIG. 19 of the drawings. Thus, punches or dies 462 would apply sufficient pressure to reduce the diameter of the opening 443 on horizontal centers to 0.060 of an inch while the clinching dies or punches 464 would reduce the vertical diameter of the opening by flowing the metal of the pin 441 under pressure. The result would be an opening in the pin of a smaller diameter than the original diameter of the cable 440, and the internal configuration of the opening of the pin would have a spiral effect which would fit around the twists of the cable in such a manner as to provide a mechanical interference to the cable being dislodged from the pin or from the pin becoming dislodged from the cable. This is further illustrated in the enlarged cross-sectional drawings in FIGS. 6, 7 and 8. In FIG. 6, we see the details just prior to the exertion of pressure by the punches. In FIG. 7, we see the result after the pressure is applied and the pin 441 is affixed to the cable 440. We may note in FIG. 7 that there is now a relatively large depressed portion 468 on both sides of the cylinder of the pin 441. This is where presses 464 have pressed the material of the pin inwardly to flow around the cable. In FIG. 8, another section is taken a small distance away from the section of FIG. 7 to illustrate the twist of the cable within the pin, and the resulting section of the configuration of the opening 443 resulting in the pin.

Since it is impractical to move more than about 10 percent of the material in a metal piece without creating metal fatigue, it is desirable to either push a piece of metal with a bald punch or to use a flat punch against a rounded section of metal. In the application of these principles to the invention, we find a flat punch such as punchers 464 placed against the rounded section of pin 441 as best illustrated in FIG. 3. Pressed sections 468 may also be seen in the other FIGS. of the drawings, such as in FIGS. 1 and 2.

While a preferred form of the invention has been illustrated with braided wire cable and steel pins, the components of the belt may be constructed of any suitable materials. In addition, the method of affixing the pins of the invention may be applied to any transmission pin material, whether metal or plastic, which has the property of flow under pressure or heat, and the further property of maintaining its deformed condition or mass after the pressure or heat is removed so that any number of such materials may be utilized for both the method and construction of the invention.

I claim:

1. A method for attaching a transverse transmission pin to at least one flexible elongated cable element which comprises the steps of providing the transmission pin with at least one opening substantially normal to the axis of the pin and relatively greater in diameter than the diameter of the cable, inserting said cable into said opening, and then applying pressure at the ends of the transmission pin, and at points of the pin substantially normal to both the axis of the pin and the axis of the cable and being within at least one common plane with said pin opening, and continuing to apply pressure until the material of the pin flows into at least a portion of the clear space between the cable and the opening in the pin until a sufficient mass of material of the transmission pin has flowed to reduce the internal diameter of the opening to substantially a diameter relatively smaller than the normal diameter of the cable within said opening.

2. A method for attaching a transverse transmission pin to at least one flexible elongated cable as defined in claim 1, in which the cable is selected from a type of cable having twisted strands and the transmission pin is selected from a material having the quality of flow under pressure and the pressure steps are applied until the material of the pin flows into the spaces between the aforesaid twisted strands at the surface of the cable.

3. The method as defined in claim 2 which comprises the further steps of selecting a cable having a plurality of main strands, with each of said main strands having a plurality of smaller strands twisted together, and the further step of selecting a transmission pin made of a metal, or plastic, having the quality of flow under pressure and the further quality of maintaining its mass in deformed position after the pressure has been applied.